July 10, 1956  A. S. GILL, JR  2,753,854
SELF-ADJUSTING VALVE ACTUATING LINKAGE
Filed Jan. 20, 1954
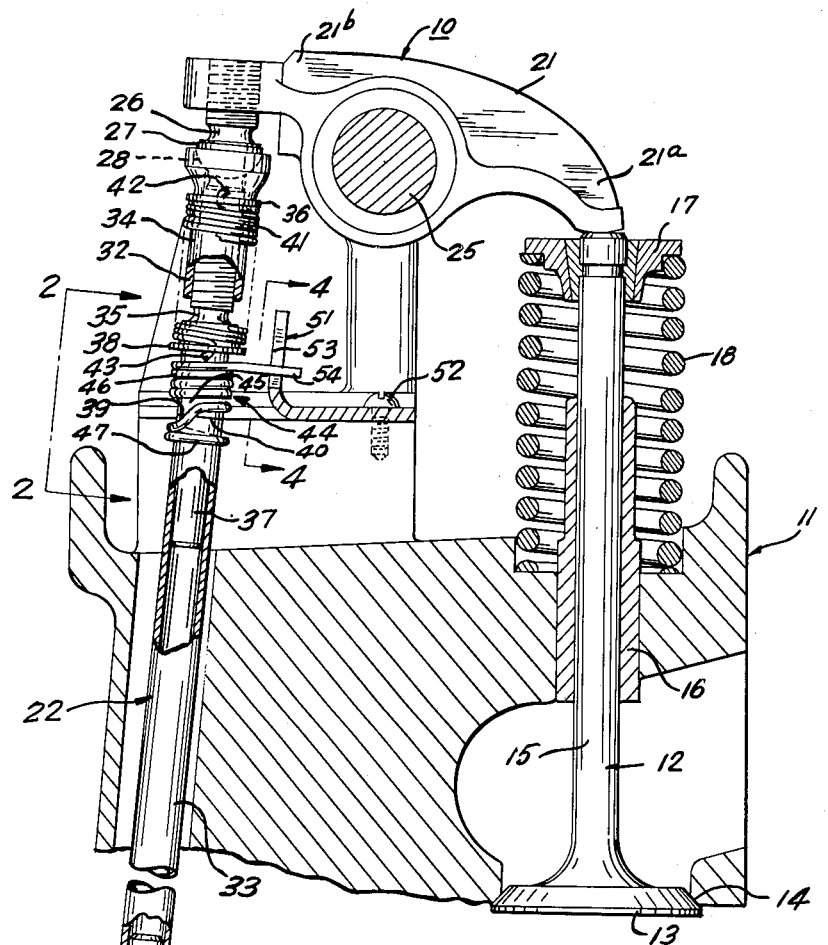
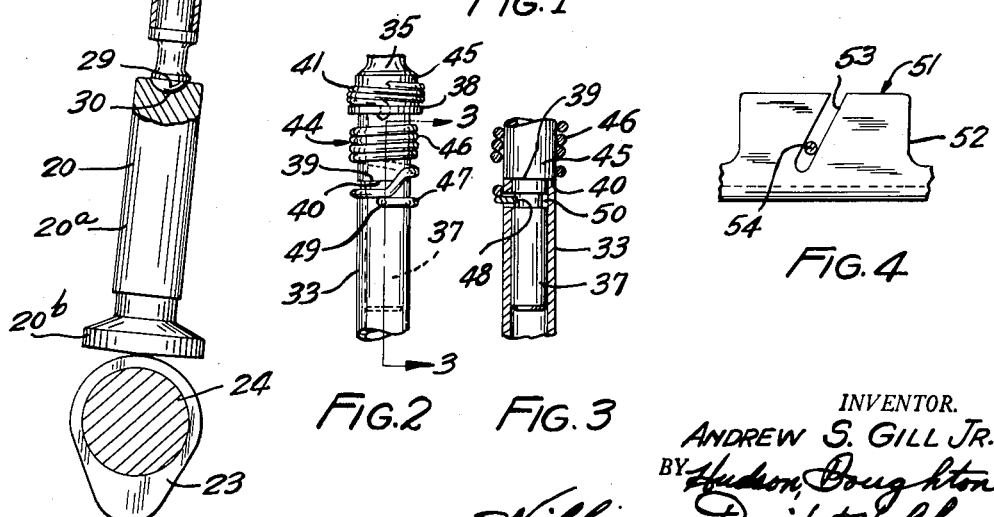
FIG.1  FIG.2  FIG.3  FIG.4
INVENTOR.
ANDREW S. GILL JR.
BY Hudson, Boughton,
Williams, David & Hoffmann
ATTORNEYS

United States Patent Office 2,753,854
Patented July 10, 1956

2,753,854

SELF-ADJUSTING VALVE ACTUATING LINKAGE

Andrew S. Gill, Jr., Maple Heights, Ohio, assignor to Eaton Manufacturing Company, Cleveland, Ohio, a corporation of Ohio Application January 20, 1954, Serial No. 405,124

8 Claims. (Cl. 123—90)

This invention relates to engine valve mechanisms and, more particularly, to valve actuating linkages of the automatic length adjusting type in which the automatic adjustment of the length takes care of variations due to expansion, contraction, wear and other causes and insures proper seating of the valve during each valve operating cycle.

An object of the invention is to provide engine valve actuating linkage embodying a rotative movement responsive length adjusting means comprising threadedly connected linkage members, and in which novel means is employed for preventing or limiting rotation of an adjacent linkage member.

Another object of the invention is to provide novel valve actuating linkage of this character which is very simple, durable and effective and includes a rocker means and an axially reciprocable push rod means, and in which one of the threadedly connected members of the length adjusting means and the adjacent linkage member whose rotation is prevented or limited are axially adjacent members of the push rod means.

Still another object is to provide valve actuating linkage of this character in which the length adjusting rotative movement is applied to the length adjusting means through a clutch means, and in which a portion of such clutch means serves to prevent or control the rotation of the adjacent linkage member.

Yet another object is to provide a novel form of length adjusting push rod means for engine valve actuation in which one of a pair of axially adjacent push rod members is rotated by a clutch means and the other member is substantially held against rotation by a portion of the same clutch means.

As a further object, this invention provides novel length adjusting engine valve linkage of the kind above referred to in which the clutch means is of the coiled wire or so-called "scotch coil" type and is adapted to grip and apply rotative movement to one of the axially adjacent push rod members, and in which a portion of such coiled wire clutch means has holding engagement with the other of the axially adjacent push rod members.

Additionally, this invention provides novel length adjusting push rod means of the kind indicated above in which one of the threadedly connected push rod members has a stem portion in telescoping engagement with and rotatable relative to an axially adjacent push rod member, and in which a portion of the coiled wire clutch means maintains such telescoping engagement and also prevents or controls rotation of the axially adjacent push rod member.

The invention can be further briefly summarized as consisting in certain novel combinations and arrangements of parts hereinafter described and particularly set out in the claims hereof.

In the accompanying sheet of drawings, forming a part of this specification:

Fig. 1 is mainly a vertical transverse section taken through an engine valve actuating mechanism embodying the present invention;

Fig. 2 is a partial side elevation looking toward the clutch means of the mechanism as indicated by the direction line 2—2 of Fig. 1;

Fig. 3 is a sectional detail view taken through the push rod means as indicated by section line 3—3 of Fig. 2; and Fig. 4 is a partial side elevation of the cam means serving the length adjusting means, the view being taken as indicated by the direction line 4—4 of Fig. 1.

As representing one practical embodiment of this invention, the drawings show valve mechanism 10 as forming a part of an internal combustion engine 11 having a movable valve 12. The valve 12 is of a conventional type having a head 13 engageable with a valve seat 14 and a stem 15 extending through and slidable in a guide bushing 16. A spring seat 17 carried by the outer or upper end of the stem 15 is engaged by a valve spring 18 which acts to normally urge the valve toward its closed position in engagement with the valve seat 14.

The valve mechanism 10 also comprises thrust transmitting linkage extending between the valve stem 15 and a tappet 20 of the engine and comprising, in general, a rocker member 21 and a push rod means 22. The tappet 20 is of a conventional form having a stem 20$^a$ slidably mounted in a guideway of the engine and a lower follower portion 20$^b$ engaged by a main actuating cam 23 of a conventional cam shaft 24.

The rocker member 21 is a conventional rocker member in the form of a lever rockable about the axis of a rockshaft 25 and having one arm 21$^a$ thereof in engagement with the valve stem 15 and its other arm 21$^b$ engaged by the upper end of the push rod means 22. The rocker arm 21$^b$ preferably carries a threadedly adjustable thrust member 26 having a substantially semispherical head 27 rockably engaging in a socket 28 on the upper end of the push rod means 22. The lower end of the push rod means 22 is preferably also provided with a convexly rounded thrust portion 29 which seats in a socket recess 30 of the tappet 20.

The push rod means 22 comprises a length adjusting upper push rod portion or unit 32 and a lower hollow push rod member 33. The length adjusting portion 32 is formed by a pair of relatively rotatable, threadedly connected screw members constituting the push rod members 34 and 35. The push rod member 34 is in the form of an internally threaded sleeve or nut member having the socket 28 in the upper end thereof and also having a collar or flange 36 thereon adjacent the socket. The push rod member 35 comprises an externally threaded portion or screw member extending into the threaded sleeve of the push rod member 34. The member 35 also has a stem portion 37 which extends in telescoping relation into, and is rotatable in, the upper end of the axially adjacent hollow push rod member 33. The push rod member 35 likewise has a collar or flange 38 thereon at an intermediate point of its length, and also has an annular shoulder 39 spaced below the collar 38 and seating against the annular upper end surface 40 of the hollow push rod member 33.

The length adjusting push rod portion 32 also comprises a torsion spring 41 disposed around the push rod members 34 and 35 and is provided at its upper and lower ends with hook portions 42 and 43. These hook portions 42 and 43 are engaged, respectively, in openings of the collars 36 and 38 for connecting the ends of the torsion spring in driving relation with the push rod members 34 and 35. The torsion spring 41 is so disposed on the length adjusting portion 32 that it normally tends to cause relative rotation between the threadedly connected push rod members 34 and 35 in a direction to lengthen the valve actuating linkage by lengthening the push rod means 22 thereof.

Rotative adjusting movement is imparted to the length adjusting means 32 through a clutch means 44 which will be described next. The portion of the push rod member 35 extending between the collar 38 and the shoulder 39 is a cylindrical portion defining a clutch shaft or drum 45 which is adapted to be grippingly engaged by a gripping form of driving means or clutch sleeve 46 for imparting rotative movement to this push rod member. The clutch sleeve 46 is disposed around the clutch shaft 45 and is here shown as being in the form of a coiled wire clutch sleeve of the kind sometimes referred to as a scotch coil.

This coiled wire clutch sleeve 46 has the characteristic of being contractible into a gripping and driving engagement with the clutch shaft 45 when a wind-up movement is imparted to the upper end of the sleeve. The clutch sleeve 46 releases its gripping engagement on the clutch shaft 45 when an unwinding movement is imparted to such relatively movable upper end of the sleeve.

In accordance with an important feature of the present invention, the lower end of the coiled wire clutch sleeve 46 serves the dual purpose of holding the push rod member 33 against rotation relative to the push rod member 35 and maintaining the telescoping engagement of the stem portion 37 of the push rod member 35 in the hollow push rod member 33. For this purpose, the lower end of the clutch sleeve 46 is formed into a ring portion 47 which surrounds the upper end of the hollow push rod member 33. The extreme end of the wire of the ring portion 47 forms an inturned locking projection or key element 48 which extends inwardly through a radial opening 49 of the hollow push rod member 33 and engages in an annular groove 50 of the stem 37. The engagement of the locking projection 48 in the groove 50 prevents withdrawal of the stem 37 from the hollow push rod member 33, without interfering with rotation of this stem in such hollow push rod member. The cooperation of the ring portion 47 and the locking element 48 with the push rod member 33 also serve to mount and locate the clutch sleeve 46 on the push rod means 22 with this sleeve in the desired surrounding relation to the clutch shaft 45.

The rotative movement which is imparted to the push rod member 35 through the clutch sleeve 46, is derived from an auxiliary cam means 51 provided on the engine 11 adjacent the push rod means 22 and which is responsive to axial movement of such push rod means. The cam means 51 comprises a fixed cam member 52 suitably secured to an adjacent part of the engine 11 and carries a fixed cam element in the form of an inclined cam slot 53. The cam means 51 also comprises a movable cam element or cam follower 54 engaging in the inclined cam slot 53. The movable cam element 54 is formed by a projecting portion of the clutch sleeve 46, preferably by a radially projecting arm defined by the upper end of the length of wire forming the clutch sleeve.

It is important to observe that a desired relation exists between certain of the cooperating thrust surfaces of the linkage in that the area of surface contact between the ball portion 27 of the rocker member 21 and the socket 28 at the upper end of the push rod means 22, is substantially greater than the surface contact area between the annular shoulder 39 of the push rod member 35 and the end surface 40 of the hollow push rod member 33. Because of this relatively larger surface contact area at the upper end of the length adjusting means 32, the amount of friction between the contact surfaces at the upper end will also be relatively greater and will tend to hold the push rod member 34 against rotation while rotative movement is being imparted to the push rod member 35 through the clutch sleeve 46 in a direction to screw the push rod member 35 into the push rod member 34 to thereby shorten the valve linkage by shortening the push rod means 22 thereof.

In the operation of the valve linkage, an upward axial movement imparted to the push rod means 22 by the main actuating cam 23, will cause valve opening movement to be transmitted through the linkage to the valve 12. During this upward valve opening movement of the push rod means 22, and during that portion of its downward movement which precedes the seating of the valve 12 against the seat 13, the linkage will be under valve actuating load such that the friction existing between the ball portion 27 and the socket 28, will tend to hold the push rod member 34 against rotation about the push rod axis. The direction of inclination of the cam slot 53 is such that during the downward movement of the push rod means 22 which precedes the seating of the valve 12, the movable cam element 54 is advanced along the slot, thereby producing a wind-up gripping action of the clutch sleeve 46 on the clutch shaft 45 which causes the clutch sleeve to grip and rotate the push rod member 35.

The rotation thus imparted to the push rod member 35 screws the same into the push rod member 34, thereby shortening the valve actuating linkage and also tensioning the torsion spring 41. The shortening of the valve actuating linkage introduces thereinto what can be conveniently referred to as a small amount of "lift loss" but which is insufficient in amount to prevent opening of the valve 12 to the desired extent by the linkage.

Substantially simultaneously with the seating of the valve 12, the valve actuating load is removed from the linkage and the tendency of the ball portion 27 to frictionally hold the push rod member 34 against rotation is relieved. The torsion spring 41 will thereupon rotate the push rod member 34 in a direction to automatically lengthen the linkage by lengthening the push rod means 22. The lift loss introduced into the linkage during the early part of the valve closing movement insures a full and positive seating of the valve 12 and, immediately after such seating of the valve takes place, the lift loss is removed from the linkage by the automatic lengthening resulting from the rotation of the push rod member 34 by the torsion spring 41.

The succeeding upward axial movement of the push rod means 22 returns the movable cam element 54 to the upper portion of the inclined cam slot 43 and thereby releases the gripping action of the clutch sleeve 46, but by the time this releasing of the clutch sleeve takes place, the automatic lengthening of the linkage by the action of the torsion spring 41 in rotating the push rod member 34 will have occurred.

Reverting to the holding action of the clutch means 44 on the push rod member 33, it will be seen that the locking element 48 will hold this push rod member against rotation except for the small amount of rotary movement which the ring portion 47 will impart thereto while the clutch sleeve 46 is imparting rotation to the push rod member 35. Thus the axially adjacent hollow push rod member 33 will never have any rotative movement of its own which is relative to the push rod member 35 and which could interfere with or disturb the length adjustment being accomplished by the length adjustitng means 32.

In addition to accomplishing an automatic length adjustment of the linkage for insuring proper seating of the valve 12 and compensating for wear and the effects of expansion and contraction, the length adjusting means 32 also prevents or minimizes uneven wear which might otherwise occur as the result of the relative rocking movement between the rocker member 21 and the upper end of the push rod means. This elimination of uneven wear is achieved by an intermittent unidirectional rotative movement being imparted to the length adjusting means 32, as a unit, about the push rod axis. This intermittent or step-by-step unidirectional rotative movement results from the conjoint action of the clutch sleeve 45 and the torsion spring 41, during which the push rod members 35 and 34 are rotated in succession by the clutch sleeve and torsion spring, respectively. The conjoint action of the clutch sleeve and torsion spring thus produces a more or less continuous, but intermittent, unidirectional rotation of the length adjusting means 32 about the push rod axis during the reciprocation of the push rod means 22.

From the accompanying drawings and the foregoing detailed description, it will now be understood that this invention provides engine valve mechanism embodying novel valve actuating linkage of the automatic length adjusting type in which rotative movement imparted to threadedly connected linkage members through a cam actuated clutch means produces the desired length adjustment of the linkage for insuring proper seating of the engine valve, and in which a portion of the same clutch means serves to prevent or control the rotation of an adjacent linkage member. It will now also be seen that the invention provides novel valve actuating linkage of this kind in which two linkage members comprise axially adjacent push rod members, one of which is gripped by the clutch means and the other is held against rotation by a portion of the same clutch means. Additionally, it will now be seen that this invention provides a coiled wire clutch sleeve as such clutch means and employs a portion of such wire sleeve as a holding means for preventing or limiting rotation of one of the two axially adjacent push rod members and for maintaining a desired telescoping engagement between such two axially adjacent members.

Although the novel valve actuating linkage has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In engine valve linkage of the kind adapted to be actuated by a rotatable engine cam, a length adjusting means comprising a pair of threadedly connected linkage members adapted to shorten the linkage in response to relative rotation between said members, torsion spring means effective on said members to cause lengthening of said linkage, an adjacent linkage member engaged by one member of said pair, means other than said engine cam for producing a rotative movement in response to actuation of the linkage, and clutch means effective to transmit such rotative movement to said one member and including holding means engaging said adjacent linkage member and limiting rotation of the latter.

2. In engine valve linkage of the kind adapted to be actuated by a rotatable engine cam, a pair of threadedly connected push rod members, torsion spring means engaging said pair of members and tending to cause relative rotation therebetween in a direction to lengthen said linkage, an adjacent push rod member engaged by one member of said pair, other cam means for producing a rotative movement in response to axial movement of the linkage, and clutch means effective to transmit such rotative movement to said one member and including holding means engaging said adjacent push rod member and limiting rotation of the latter.

3. In engine valve linkage of the kind adapted to be actuated by a rotatable engine cam, a pair of threadedly connected push rod members adapted for relative rotation for shortening the linkage, torsion spring means engaging said pair of members and tending to cause relative rotation therebetween in a direction to lengthen said linkage, an adjacent push rod member engaged by one member of said pair, other cam means for producing a rotative movement in response to axial movement of the linkage, and a clutch member actuated to an engaged condition by the rotative movement produced by said other cam means and adapted to grip and impart rotation to said one member, said clutch member having an extension portion in holding engagement with said adjacent push rod member for limiting rotation of the latter.

4. In engine valve linkage of the kind adapted to be actuated by a rotatable engine cam, a pair of threadedly connected push rod members adapted for relative rotation for shortening the linkage, torsion spring means engaging said pair of members and tending to cause relative rotation therebetween in a direction to lengthen said linkage, an adjacent hollow push rod member engaged by one member of said pair and having an opening in the wall thereof, said one member having a stem portion extending into said hollow push rod member and which stem portion is provided with an annular groove located substantially opposite said opening, other cam means responsive to the actuation of the linkage by said engine cam, and clutch means actuated by said other cam means and effective to transmit rotative movement to said one member and including holding means engaging in said opening and groove.

5. In engine valve linkage of the kind adapted to be actuated by a rotatable engine cam, a pair of threadedly connected push rod members adapted for relative rotation for shortening the linkage, torsion spring means engaging said pair of members and tending to cause relative rotation therebetween in a direction to lengthen said linkage, an adjacent push rod member engaged by one member of said pair, other cam means responsive to the actuation of the linkage by said engine cam, a coiled wire sleeve disposed in coaxial relation to said one member and adapted to be actuated by said other cam means for gripping and rotating said one member, and a wire extension portion connected with said sleeve and having holding engagement with said adjacent push rod member for limiting rotation of the latter.

6. In engine valve linkage of the kind adapted to be actuated by a rotatable engine cam, a pair of threadedly connected push rod members adapted for relative rotation for shortening the linkage, torsion spring means engaging said pair of members and tending to cause relative rotation therebetween in a direction to lengthen said linkage, an adjacent hollow push rod member engaged by one member of said pair and having an opening in the wall thereof, other cam means responsive to the actuation of the linkage by said engine cam, a coiled wire sleeve disposed in coaxial relation around said one member and being contractible and rotatable by said other cam means for gripping and rotating said one member, and a wire extension portion connected with said sleeve and including loop means disposed around said hollow push rod member, said loop means having an end portion engaged in said opening.

7. In length adjusting engine valve linkage, a pair of threadedly connected linkage members one of which is a push rod member having a stem portion, a second push rod member having telescoping engagement with the stem portion of said one member, torsion spring means effective between said threadedly connected linkage members and tending to cause lengthening of said linkage, a coiled wire clutch sleeve adapted to grip said one member for transmitting rotary movement thereto, cam means engaged by a portion of said sleeve for causing rotation of the sleeve, and holding means defined by an extension portion of the wire of said sleeve and engaging said second push rod member for limiting rotation of the latter and for maintaining said telescoping engagement.

8. In length adjusting engine valve linkage, a pair of threadedly connected push rod members one of which has a stem portion, an adjacent push rod member having a hollow end in which said stem portion has telescoping engagement, torsion spring means effective between said pair of members and tending to cause relative rotation in a direction to lengthen the linkage, a coiled wire clutch sleeve disposed around and adapted to grip and rotate said one member, means defining an inclined cam slot, said sleeve having a projecting arm engaged in said cam slot for causing contraction and rotation of said sleeve in response to axial movement of said sleeve with said push rod members, and holding means defined by an extension portion of the wire of said sleeve and engaging said second push rod member for limiting rotation of the latter and for maintaining said telescoping engagement.

References Cited in the file of this patent
UNITED STATES PATENTS 2,642,048     Russell  --------------- June 16, 1953